(12) United States Patent
Staubli

(10) Patent No.: US 11,020,836 B2
(45) Date of Patent: Jun. 1, 2021

(54) DEVICE FOR AUTOMATICALLY CHANGING GRINDING DISCS

(71) Applicant: Otto Suhner AG, Brugg (CH)

(72) Inventor: Remo Staubli, Fischbach-Goslikon (CH)

(73) Assignee: Otto Suhner AG, Brugg (CH)

( * ) Notice: Subject to any disclaimer, the term of this patent is extended or adjusted under 35 U.S.C. 154(b) by 295 days.

(21) Appl. No.: 16/065,404

(22) PCT Filed: Feb. 1, 2017

(86) PCT No.: PCT/EP2017/052179
§ 371 (c)(1),
(2) Date: Jun. 22, 2018

(87) PCT Pub. No.: WO2017/134122
PCT Pub. Date: Aug. 10, 2017

(65) Prior Publication Data
US 2019/0001460 A1    Jan. 3, 2019

(30) Foreign Application Priority Data

Feb. 4, 2016 (CH) ........................................ 151/16

(51) Int. Cl.
*B24B 27/00* (2006.01)
*B23Q 3/155* (2006.01)
*B24D 9/08* (2006.01)

(52) U.S. Cl.
CPC ...... *B24B 27/0038* (2013.01); *B23Q 3/15526* (2013.01); *B24D 9/085* (2013.01);
(Continued)

(58) Field of Classification Search
CPC ............ B24B 27/0038; B23Q 3/15526; B23Q 2003/15527; B23Q 2003/15528; B24D 9/085; Y10T 483/174
See application file for complete search history.

(56) References Cited

U.S. PATENT DOCUMENTS 7,144,313 B1   12/2006  Greenwood
9,656,360 B2   5/2017   Multhammer
(Continued)

FOREIGN PATENT DOCUMENTS

DE    102006060310    6/2006
DE    202013101858    7/2013
(Continued)

*Primary Examiner* — Dung Van Nguyen
(74) *Attorney, Agent, or Firm* — Volpe Koenig

(57) ABSTRACT

A device (1) for automatically changing sanding discs (12) includes a stacking device (10) for a plurality of grinding discs (12) and a guide element (16) for orienting the suction openings (32) in the grinding discs (12) along a common central axis (18), wherein the guide element (16) is arranged eccentrically with regard to the central axis (18). A positioning element (17) is provided for positioning a tool head of a grinding device, wherein the positioning element (17) and the guide element (16) are mounted in a floating manner. A device (1) for automatically changing grinding discs (12) includes a detachment device (50), wherein the detachment device (50) has a bearing surface (51) for a grinding-disc receptacle. The bearing surface (51) has an opening (52), the diameter of which is greater than the diameter of the grinding disc (12). A separating element (53) is arranged above the opening (52). A system includes a device (1) for automatically changing grinding discs (12) containing a stacking device (10) and a detachment device (50).

10 Claims, 3 Drawing Sheets

(52) U.S. Cl.
CPC ............ *B23Q 2003/15527* (2016.11); *B23Q 2003/15528* (2016.11); *Y10T 483/174* (2015.01)

(56) References Cited

U.S. PATENT DOCUMENTS

| | | | |
|---|---|---|---|
| 9,656,364 B2 * | 5/2017 | Ryan | ............... B24D 9/085 |
| 9,969,052 B2 * | 5/2018 | Bonnet | ............... B24B 23/046 |
| 2007/0232211 A1 * | 10/2007 | Chen | ............... B24D 9/085 |
| | | | 451/442 |

FOREIGN PATENT DOCUMENTS

| | | |
|---|---|---|
| EP | 1916062 | 4/2008 |
| EP | 2463056 | 5/2012 |
| EP | 2842689 | 7/2015 |
| WO | 2014205475 | 12/2014 |
| WO | 2015074089 | 5/2015 |
| WO | 2015125068 | 8/2015 |

\* cited by examiner

DEVICE FOR AUTOMATICALLY CHANGING GRINDING DISCS

BACKGROUND

The subject of the invention is a device for automatically changing sanding disks. The subject of the invention is also a system comprising a device for automatically changing sanding disks.

An automatic sanding device contains a tool head having a receiving device for a sanding disk. This receiving device is configured for example as a backing pad which contains a hook-and-loop fastener and can be configured in particular as a Velcro® pad. A sanding disk can be applied to the backing pad and held on the backing pad by the hook-and-loop fastener. The hooks of the hook-and-loop fastener in the process engage in the felt-like surface of the sanding disk, such that the sanding disk is held on the surface of the backing pad by the hook-and-loop fastener on the tool. The backing pad can execute a rotary movement or an eccentric movement, or a combination in the manner of a wobbling movement, such that a surface, of any desired shape, of a workpiece can be polished with the sanding tool. The tool head can be a constituent part of a manipulation device; for example, the tool head can be attached to a manipulation arm, in particular to a robot arm.

Robot arms for various applications are known for example from WO2015074089A1. A robot arm of this type consists of a plurality of arm segments, damping elements for coupling the first and second arm segments, a sensor for sensing the location of the first arm segment with respect to the second arm segment, and a control unit which controls the drive motor for the robot arm depending on the received sensor signal and moves the robot arm into an intended position when no force is acting on the robot arm. A robot arm of this type is used for example to stack articles, this being shown in WO2014205475A1. If there is a desire to precisely position such articles, the article has to be grasped by a manipulator and moved precisely, for which purpose, according to WO2014205475A1, an actuator is used which is arranged between the manipulator and the article to be positioned.

As wearing parts, sanding disks have to be changed periodically. One possible way of changing the sanding disks consists in interrupting the sanding operation, shutting off the sanding device and manually changing the sanding disk, because the complexity of this work sequence as described above means that automation thereof does not appear to be economically viable.

One possible solution approach includes breaking down the complex manipulation tasks into simple subtasks such that the control complexity for each of the subtasks is reduced. This approach is followed by DE 20 2013 101 858 U, which discloses a plant for automatically changing sanding disks. The sanding disks are changed in three stations, which are visited successively by the tool arm of the robot: a detaching station, an orienting station and a loading station.

The detaching station is configured as a horizontal base on which the tool head having the sanding disk to be changed can be set down. A slide is positioned between the sanding disk and the tool head and the sanding disk is pushed against the base by the slide. When the tool head is removed from the detaching station, the sanding disk is retained by the slide. Then, the slide is returned into its starting position and the base is tilted such that the used sanding disk can be disposed of.

The tool head subsequently travels to an orienting station, which serves to position the tool head in a defined position such that a new sanding disk can be positioned correctly on the tool head. To this end, the station contains sensors, which sense the intended position of the suction openings in the tool head and switch on the servomotor of the tool head via a controller, in order to move the tool head into the intended position.

Connected downstream of the orienting station is a loading station, which contains a stack of new sanding disks. The oriented tool head can be positioned precisely on the stack of sanding disks, in order to take the uppermost sanding disk from the stack. The sanding disk sticks in the correct position, wherein the correct position is understood to be a position in which the suction openings in the tool head are located over the openings in the sanding disk.

This device has proven to be disadvantageous in that the sanding disk can be damaged while it is being detached by the slide, when its position relative to the detaching station has not been determined precisely enough. In order to remedy this drawback, a device for automatically changing sanding disks was designed as per EP 2 842 689 B1. A device of this kind has a stop element for the removal of a sanding disk from a sanding tool, the head plate with the sanding disk being able to be placed against said stop element in a removal position, at least one removal finger, which is adjustable between a retracted position and an engagement position, and a clamping device, by way of which the removal finger is movable relative to the stop element. By use of the removal finger, the sanding disk can be firmly clamped to the stop element. The removal finger is free of sharp edges, thereby avoiding damage to the sanding disk and accordingly any discontinuation of the removal operation on account of incompletely removed sanding disks or blocking of the removal device.

However, it is complicated to change the sanding disks, since the sanding tool guided on the robot arm has a special attachment for removing the sanding disks. This attachment has a plurality of recesses in its circumference, into which the fingers of the sanding disk removal device can engage. To this end, it is necessary for the sanding tool attached to the robot arm to be positioned with the used sanding disk precisely on the sanding disk removal device. To this end, not only does the central axis of the sanding disk have to coincide with the central axis of the sanding disk removal device, but also the angle at which the sanding disk comes to lie on the sanding disk removal device has to be maintained exactly. If angular deviations occur, the fingers of the sanding disk removal device can no longer grasp the sanding disk, and so the removal of the sanding disk cannot occur. If the used sanding disk has been grasped by the fingers of the sanding disk removal device, it can be removed from the tool. To this end, the fingers of the sanding disk removal device engage in corresponding grooves on the sanding disk support of the tool. This means, however, that the sanding disk support has to be manufactured exactly in accordance with the specifications of the sanding disk removal device.

Following the removal of the used sanding disk, the tool is positioned on a sanding disk dispenser by the robot arm. The sanding disk dispenser or the stacking device is configured as a cylindrical cavity in which a plurality of sanding disks are stacked on top of one another. The inside diameter of the cavity is slightly greater than the outside diameter of the sanding disks. The sanding disks contain a plurality of holes. A respective spike has been passed through two of these holes, such that the sanding disks are fixed in a particular position by the corresponding spike.

It is clear from the preceding description that the automatic changing of sanding disks still involves a complicated sequence which requires that the tool head be oriented twice, upon removal of the sanding disk and upon reception of a new sanding disk.

SUMMARY

It is an object of the present invention to provide a device for simplifying the automatic changing of sanding disks.

In particular, it is an object of the invention to orient the sanding disk receptacle of the sanding tool and the sanding disk in a simpler manner such that suction openings, arranged in the sanding disk receptacle, for sanding material are aligned with corresponding openings arranged in the sanding disk such that the extraction of abraded material by suction is not impeded by the sanding disk.

This object is achieved by a device having one or more features of the invention. Advantageous configurations of the device are described below and in the claims.

A device for automatically changing sanding disks comprises a stacking device for a plurality of sanding disks, and a guide element for orienting the sanding disks on top of one another along a common central axis, wherein the guide element is arranged eccentrically with respect to the central axis. A positioning element for positioning a tool head is provided, wherein the positioning element and the guide element are mounted in a floating manner. The positioning element is arranged in particular along the central axis, such that the central axis corresponds to the longitudinal axis of the positioning element. The positioning element is in particular a rotationally symmetrical body, the axis of symmetry of which is the central axis. For example, the positioning element can be configured as a cylinder.

The advantage of this floating mounting is that the tool can be positioned very easily on the positioning element. A hole in the tool fits around the positioning element, arranged in a central position, having a conical upper end, and can be positioned thereon, even when the tool does not meet the positioning element exactly in the middle, since the position of the tool head with the sanding disk receptacle can be compensated via the floating mounting. Thus, a time saving and reduced demands as regards the precision of positioning arise when the tool head with the sanding disk receptacle is positioned on the positioning element of the stacking device.

According to one exemplary embodiment, a base element for receiving the positioning element and the guide element is provided. In particular, the base element can contain a vibratory element, for example at least one spring element, by way of which the base element is allowed to move in a radial direction with respect to the central axis. The base element can also be configured as an intermediate base, which is arranged in a stacking device and is held by the resilient elements.

The base element can be suspended in a housing of a stacking device. The vibratory element can also contain an elastic material, wherein the elastic material can be reversibly extendable or compressible in a radial direction.

A radial direction is understood here to mean any deviation of the central axis in a normal plane, containing the base element, with respect to the central axis. If the sanding disks are arranged horizontally in the stacking device, the base element is likewise arranged horizontally. The normal plane is in this case a horizontal plane. If a Cartesian coordinate system is arranged in this horizontal plane such that the Z axis corresponds to the central axis, movements of the base element in at least one of the X and Y axes can take place.

The positioning element is axially movable in particular in the direction of the central axis. The positioning element can be configured as a mandrel which is accommodated in the base element. In particular, the positioning element can be accommodated in a bore in the base element, wherein a spacer element is arranged in the bore. The spacer element is thus located at or beneath the lower end of the positioning element. The positioning element can thus yield in the axial direction upon contact with a sanding disk receptacle of a tool head, such that gentle contact between the positioning element and sanding disk pad takes place. As a result, damage to the sanding disk receptacle on position finding can be avoided, since, upon contact with the positioning element, no harmful forces are introduced into the sanding disk receptacle. The spacer element can contain at least one element of the group consisting of spring elements, elastic elements and magnetizable elements.

According to one exemplary embodiment, the positioning element has a greater height than the guide element. This ensures that, during the positioning operation in order to set the radial position, the sanding disk receptacle comes into contact with the positioning element and not with the guide elements. This means that the central axis of the sanding disk receptacle is made to coincide with the central axis of the stacking device. The sanding disk receptacle is freely movable in order to be able to exert a wobbling movement during the sanding operation. As a result of this free movability in the direction of rotation, however, the precise whereabouts of the sanding disk, or of the centrally arranged opening thereof, are not known until the sanding disk receptacle has been received on the positioning element. As soon as the upper end of the positioning element engages in the sanding disk receptacle, the axial orientation of the sanding disk receptacle with respect to the central axis of the sanding disks and that of the positioning element is defined. Therefore, only the radial position of the sanding disk receptacle with respect to the sanding disk has to be found. The guide element extends through one of the openings arranged eccentrically with respect to the central opening, said openings being provided in the sanding disk in order to allow abraded material to be extracted by suction during operation.

The positioning element is, according to one exemplary embodiment, configured as a mandrel, wherein the positioning element has a lower end which is accommodated in the bore and an upper end which projects out of the uppermost sanding disk, wherein the upper end comprises in particular a conical portion. The sanding disk receptacle is thus located in this position, in which it is arranged on the conical portion, i.e. not yet in contact with the guide element. Therefore, the sanding disk receptacle is freely rotatable about the positioning element, such that the correct position of the sanding disk with respect to the sanding disk receptacle can be set in a subsequent radial adjustment operation.

For adjustment in the circumferential direction, the sanding disk receptacle has to come to rest in a position over the sanding disk, in which the openings in the sanding disk are aligned with the recesses in the sanding disk receptacle when the correct position has been reached. According to one exemplary embodiment, this position can be found by means of a detection device. This position can be found for example by a single sensor. The sensor can be a sensor as described in DE 20 2013 101 858 U1 or EP 2 842 689 B1. However, only a single sensor is required, since only the angular position of the recess in the sanding disk receptacle with respect to the opening in the sanding disk has to be determined. As soon as the sensor detects a recess, the controller of the tool head is instructed to rotate the tool head and thus the sanding disk receptacle into the position in which the opening in the sanding disk and the recess in the sanding disk receptacle are aligned.

For this adjustment, it is possible, according to a further exemplary embodiment, for the sanding disk receptacle to be set into rotation by a drive element. The drive element can contain for example a nozzle, by which a jet of pressurized fluid is able to be generated. For example, the jet of pressurized fluid can be a jet of compressed air, but it is also possible for other fluids, in particular gases, to be used.

The drive element could have any other design familiar to a person skilled in the art, in order to bring about a rotational movement of the sanding disk receptacle. For example, the sanding disk receptacle could be connectable to the drive element in a force-fitting or frictional manner. The sanding disk receptacle can have for example a toothed ring which is couplable to a drive pinion. Alternatively or in addition, the drive element can contain a magnet or a magnetizable material, which can be couplable to a corresponding counterpart on the sanding disk receptacle.

According to one exemplary embodiment, the drive element configured as a nozzle serves to direct a jet of pressurized fluid onto the sanding disk receptacle in order to set the sanding disk receptacle into rotational movement. The speed of rotation of the rotational movement and/or the desired distance can be set by the duration and/or intensity of the jet of pressurized fluid. For example, a pulse of pressurized fluid with a duration of preferably at most 1 second can be applied to the sanding disk receptacle, such that the sanding disk receptacle is able to be set into rotation. The rotational movement is able to be regulated such that the sanding disk receptacle comes to rest above the sanding disk in a position in which the openings in the sanding disk are aligned with the recesses in the sanding disk receptacle when the correct position has been reached.

This position can, as in the previous exemplary embodiment, be found by a detection device, for example by means of a single sensor. The drive element has a controller, by which the correct position of the sanding disk receptacle can be determined. The drive element can for example, as described above, initiate a rotational movement of the sanding disk receptacle. Therefore, this drive element does not have to be located in the tool head, with the result that the design of the tool head can be simplified, since the tool head does not require any drive suitable for adjustment of the sanding disk receptacle.

Alternatively or in addition, the intensity of the jet of pressurized fluid can be regulated. For example, it is possible, via a change in the flow cross section of the nozzle opening, for the outlet speed of the pressurized fluid to be changed, such that the sanding disk receptacle can be moved into the position defined by the detection device by regulating the drive element.

According to one exemplary embodiment, the stacking device is accommodated in a container. The container contains a container base and a container cover with an opening, through which in each case one of the sanding disks is removable. According to one exemplary embodiment, the diameter of the opening is greater than the diameter of the sanding disk.

In particular, a retaining element can be provided, which projects into the opening. According to one exemplary embodiment, a plurality of such retaining elements can be provided. The retaining elements can be movable such that they are adjustable from a holding position into a removal position. For example, for the time in which the sanding disk is positioned on the sanding disk receptacle, they can at least partially open up the opening such that the sanding disk can be removed more easily. As soon as the sanding disk has been positioned on the sanding disk receptacle, the retaining element is moved back into the holding position, such that the stack of sanding disks is held in the opening.

The stack of sanding disks can be held by a support element which is movable with respect to the guide element and the positioning element by a tensioning element. The tensioning element can be configured as a spring element. The spring element can be arranged between the intermediate base and the support element.

According to a further exemplary embodiment, the support element can be guided by a lifting element. The lifting element allows incremental adjustment of the support element, such that, following removal of a sanding disk, the sanding disk located thereunder moves up into the position thereof. The lifting element can include a fluid cylinder, an electric motor, spring-loaded latching elements or the like.

A lifting element for the incremental feeding of the sanding disks can be used in particular when dimensionally stable sanding disks are used. A dimensionally stable sanding disk is understood to be a sanding disk which deforms only when subjected to a force of at least twice the own weight of the sanding disk.

In contrast, a flexible sanding disk is understood to be a sanding disk which can already deform under the action of its own weight. Such a sanding disk can comprise for example a sandpaper or a polishing cloth, for example made of leather of a textile material.

According to a further exemplary embodiment, the sanding disk receptacle can be set into rotational movement by the drive element, wherein this rotational movement does not need to be regulated, in contrast to the previous exemplary embodiments.

According to one exemplary embodiment, the guide element can be axially movable by an actuating element.

For adjustment, the rotating sanding disk receptacle is moved in the direction of the sanding disk until the guide element comes into contact with the surface of the sanding disk. The guide element is movable in an axial direction. In particular, the guide element can contain an actuating element which is arranged in the bore. This actuating element can be configured as a tensioning element. The tensioning element is pretensioned when the sanding disk receptacle presses on the guide element. In particular, the tensioning element can comprise a spring. The tensioning element of the guide element is slightly compressed thereby, such that the upper end of the guide element exerts a slight contact pressure on the sanding disk receptacle. As soon as the upper end of the guide element finds a recess in the sanding disk receptacle, the tensioning element can relax again. That end of the guide element that is on the sanding disk receptacle side passes into engagement with the recess, with the result that the rotational movement of the sanding disk receptacle is stopped. The correct position of the sanding disk receptacle has been reached. The sanding disk receptacle can now be moved in the direction of the sanding disk in order to receive the sanding disk from the sanding disk stack.

The actuating element can also comprise a magnetizable element, which is attached to the upper end of the guide element. With respect to this magnetizable element, a magnetizable counterpart can be arranged in the bore, wherein the magnetizable element of the upper end of the guide element and of the magnetizable counterpart in the bore repel one another. If the guide element is now moved into the bore by the contact pressure of the sanding disk receptacle, the magnetic repulsive force increases. As soon as the upper end of the guide element is located in a recess, the guide element moves out of the bore again on account of the repulsive forces and passes into engagement with the recess in the sanding disk receptacle, with the result that the rotational movement thereof is stopped. The correct position of the sanding disk receptacle has been reached. The sanding disk receptacle can now be moved in the direction of the sanding disk in order to receive the sanding disk from the sanding disk stack.

According to each of the previous exemplary embodiments, a plurality of guide elements can be provided. In particular, two or more guide elements can be provided in order to distribute the force, which acts on the guide element upon interruption of the rotational movement, to two or more guide elements, such that each guide element only has to absorb the corresponding fraction of the force.

Instead of a tensioning element or in addition to the tensioning element, the upper end of the guide element can contain a magnetizable element at the top, and in particular the upper end can contain a magnet. This magnet can be attracted by a corresponding magnetizable counterpart in the sanding disk receptacle when the sanding disk receptacle is engaged with the positioning element and during the rotation a recess comes to rest over the magnetizable end element. The magnetizable element can be contained in particular in the recess of the sanding disk receptacle.

In particular, it is an object of the invention to easily detach a used sanding disk from a sanding disk receptacle, wherein the device for detaching the sanding disk is not intended to have any moving parts.

This object is achieved by a device having one or more features of the invention. Advantageous configurations of the device are described below and in the claims.

A device for automatically changing sanding disks comprises a detaching device for sanding disks, wherein the detaching device comprises a support surface for a sanding disk receptacle. The support surface has an opening, the diameter of which is greater than the diameter of the sanding disk. A separating element is arranged above the opening. The separating element can partially cover the opening such that the sanding disk receptacle cannot pass into the opening.

In particular, the separating element can have a separating edge, wherein the separating edge can comprise a point. For the separating edge, it is also possible for a plurality of points to be provided. According to one exemplary embodiment, a V-shaped point can be provided. According to one exemplary embodiment, a point can be used, the edges of which extend asymmetrically, for example in the form of a guillotine. According to one exemplary embodiment, a W-shaped point can be used. A W-shaped point can have two point elements. According to one exemplary embodiment, a jagged profile containing a plurality of points can be provided.

The separating element can have ribs which are oriented in particular in the direction of movement of the sanding disk receptacle. These ribs can increase the dimensional stability or support the operation of detaching the sanding disk from the sanding disk receptacle. The ribs can be located only on one side of the separating element, but can also be arranged on both sides.

The separating element can be configured as a disk which, at least along the separating edge, has a wall thickness that is less than the distance of the sanding disk from the sanding disk receptacle. For example, the separating element can be configured as a thin-walled metal sheet.

According to one exemplary embodiment, the separating element is fastened to the support surface in a releasable manner by connecting means. The separating element can be removed from the support surface, for example in order to replace it with a separating element with a different configuration. In this way, the detaching device can be used for a large number of different sanding disks.

A spacer element can be provided between the separating element and the support surface. By use of the spacer element, the distance of the separating element from the support surface can be set. The use of a spacer element makes it possible to use the device for different types of sanding disks.

For example, a sanding disk can be arranged on the sanding disk receptacle in such a way that the sanding disk radially overlaps the sanding disk receptacle. The rim of such a sanding disk can be bent up such that the rim comes to lie above the separating edge.

In this case, a tiltable separating element can be used. The tiltable separating element is arranged such that, in the tilted state, the separating edge or at least the point thereof is located slightly higher than the opposite end of the separating element. When the rim of a sanding disk receptacle reaches the separating edge, a tilting mechanism is actuated at this point by the sanding disk receptacle, said tilting mechanism tilting the separating edge in the direction of the support surface, such that the setting angle of the separating element can be reduced.

As a result of the change in angle, the separating edge comes into contact with the rim of the sanding disk and pushes it in the direction of the support surface. It is then possible for the movement of the sanding disk receptacle to be continued. The separating element can remove the sanding disk gradually from the sanding disk receptacle.

According to one exemplary embodiment, the separating element can have more than one separating edge. The separating edges can be arranged in particular at more than one lateral edge of the separating element. In particular, a detaching device of this type can be used for two or more different types of sanding disks at the same time.

When a sanding disk is held on a sanding disk receptacle by a hook-and-loop fastener, a spacing between the sanding disk and the sanding disk receptacle arises for functional reasons, this being caused by the engaging elements of the hook-and-loop fastener, which are interlocked.

The wall thickness of the separating element at the separating edge is therefore preferably less than 5 mm, and in particular, the wall thickness has a maximum value in the region of 1 mm.

The separating element can contain a deflection element which can support the detachment of the sanding disk.

A method for detaching a sanding disk from a sanding disk receptacle comprises the following steps: the sanding disk receptacle is guided over the shown support surface of the detaching device, wherein the sanding disk receptacle is in contact with the support surface. In the process, the sanding disk is contacted by the separating element, which, as a disk element with a separating edge of the sanding disk receptacle, is pushed in between the sanding disk and the support surface via the separating edge, with the result that the sanding disk is detached from the sanding disk receptacle. The sanding disk drops into an opening located beneath the separating edge.

The used sanding disks can be collected in a collecting container arranged beneath the opening and can be disposed of properly.

In particular, it is possible with the solution according to the invention to dispense with a separate orienting station for exact positioning of the tool head for receiving a new sanding disk, since the positioning takes place immediately before the reception of a new sanding disk.

In particular, the device can be used for dimensionally stable and/or flexible sanding disks.

A system comprises a device for automatically changing sanding disks, containing a stacking device, according to one of the preceding exemplary embodiments, and a detaching device, according to one of the preceding exemplary embodiments.

BRIEF DESCRIPTION OF THE DRAWINGS

The invention is explained in more detail by way of an illustrated exemplary embodiment. In the drawings.

DETAILED DESCRIPTION

Figure 1:
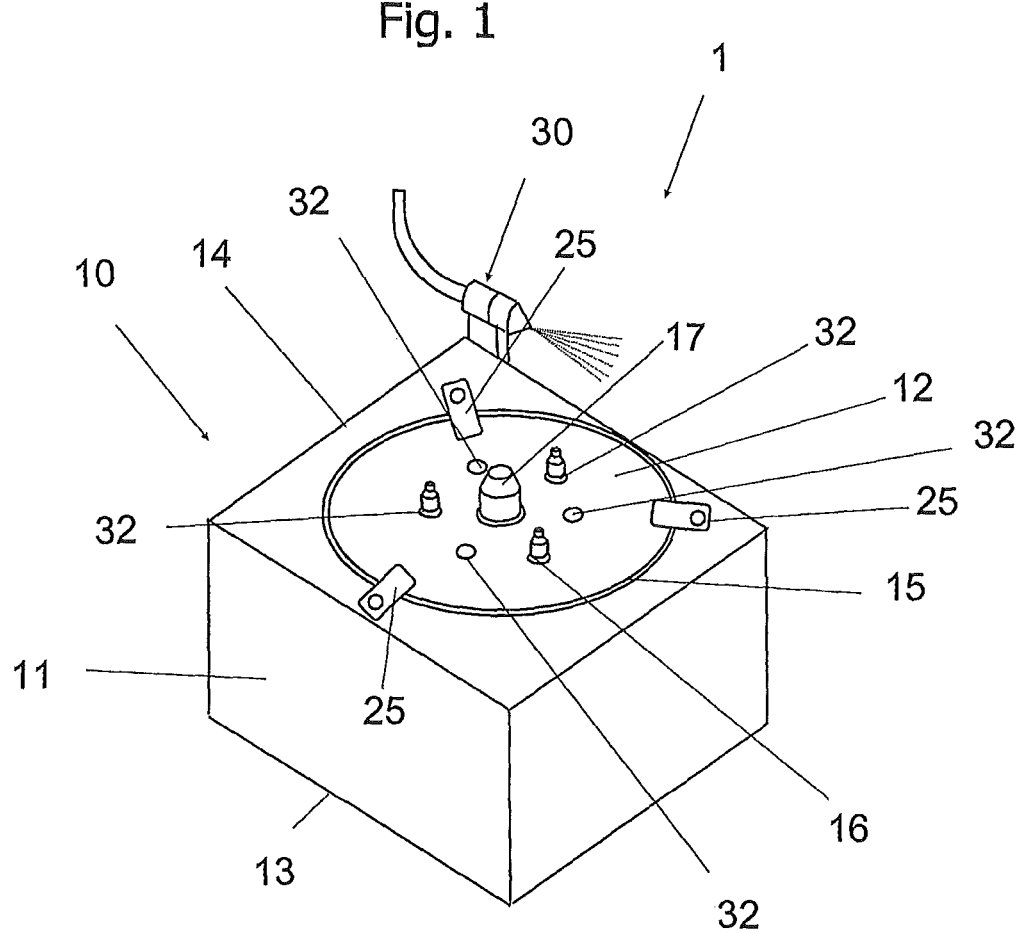
FIG. 1 shows a view a view of the stacking device for sanding disks, without sanding disks.

The device 1 according to FIG. 1 for automatically changing sanding disks comprises a stacking device 10 containing a plurality of sanding disks 12, and a guide element 16 for orienting the sanding disks 12 on top of one another along a common central axis, wherein the guide element 16 is arranged eccentrically with respect to the central axis. A positioning element 17 is provided for positioning a sanding disk receptacle, wherein the positioning element 17 and the guide element 16 are mounted in a floating manner.

According to FIG. 1, the stacking device 10 is accommodated in a container 11. The container 11 has a container base 13 and a container cover 14 with an opening 15 through which in each case one of the sanding disks 12 is removable. The diameter of the opening 15 is greater than the diameter of the sanding disk 12. Three retaining elements 25 are provided, which project into the opening 15 and to hold the sanding disks 12 in the stacking device 10. According to a variant that is not illustrated, the retaining element(s) 25 do(es) not project into the opening.

Guided through the sanding disks 12 are a positioning element 17 and three guide elements 16, the upper ends of which are visible in FIG. 1. The sanding disks 12 have openings corresponding thereto, a central opening for the positioning element 17 and, in the present illustration, six openings 32. Three of these openings 32 contain a guide element 16.

Figure 2:
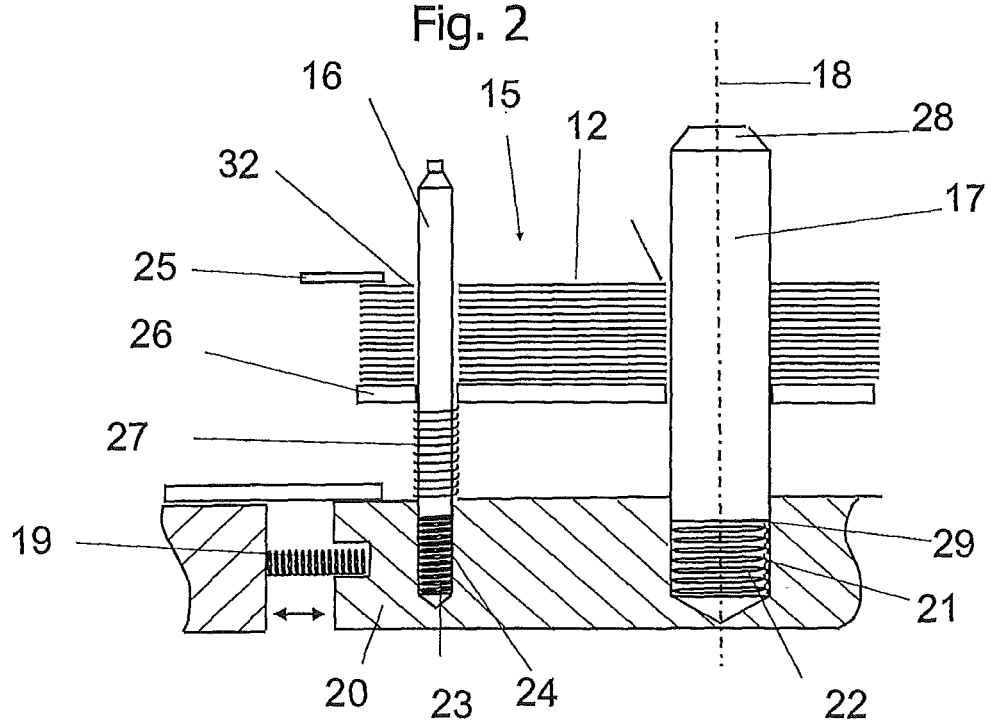
FIG. 2 shows a vertical section through the stacking device for the sanding disks according to FIG. 1.

FIG. 2 shows a detail of a section through the stacking device 10 according to FIG. 1, which extends in a plane containing the central axis 18 of the positioning element 17. In the sectional illustration, the container 11 has been omitted in order not to overload the illustration.

A base element 20 is provided to receive the positioning element 17 and the guide element 16 in the container 11. The base element 20 contains a vibratory element 19, for example a helical spring, which allows the base element 20 to move in a radial direction with respect to the central axis 18. The base element 20 can form an intermediate base in the container 11, which extends above the container base 13 illustrated in FIG. 1.

The positioning element 17 has a greater height than the guide element 16. This ensures that a sanding disk receptacle 100, also referred to as backing pad, which can be arranged on a tool head, first of all comes into engagement with the positioning element 16 before it comes into contact with the ends of the guide elements 16 on the sanding-disk-support side. The tool head contains, as sanding disk receptacle, for example a freely rotatable backing pad, which carries a sanding disk 12 in order to carry out a sanding method.

The sanding disk receptacle can execute in particular a combined rotational and translational movement, resulting in a wobbling movement. Such a sanding disk receptacle 100 is known from the prior art and is therefore not illustrated. As a result of the wobbling movement, the position of the sanding disk receptacle 100 with respect to the central axis 18 is unknown when a sanding disk receptacle 100 approaches the stacking device 10 in order to be equipped with a new sanding disk 12.

In order to position a sanding disk 12 correctly on the sanding disk receptacle, not only does the sanding disk 12 have to be positioned centrally on the sanding disk receptacle 100, but also the openings 32 in the sanding disk 12 have to be aligned with the recesses 33 in the sanding disk receptacle 100. These recesses 33 serve for the extraction by suction of abraded material which accumulates during the sanding process. The abraded material can comprise for example abrasive particles, coolant, cleaning agent. Therefore, upon each change of the sanding disk 12, the sanding disk receptacle has to be positioned with respect to the sanding disks 12 located in the stacking device 10 and adjusted. Positioning is understood here as meaning a work step which brings the central axis of the sanding disk receptacle 100 into coincidence with the central axis 18.

Adjusting is understood to mean a work step which brings the openings 32 in the sanding disk 12 into coincidence with the recesses in the sanding disk receptacle 100.

Therefore, for positioning, the sanding disk receptacle 100 is guided over the free end 28 of the positioning element 17, wherein the precise position of the central axis 18 of the positioning element 17 is not known precisely because, as is known, the sanding disk receptacle 100 is executing a wobbling movement. Formed in the sanding disk receptacle 100 is a cylindrical bore 101, the diameter D of which is greater than the upper conically extending end 28 of the positioning element 17.

Since the base element 20 is configured as a vibratory element 19 which allows the positioning element 17 to move with the base element 20 in the radial direction with respect to the central axis 18, the positioning element 17 can, by virtue of its conically tapering free upper end 28, engage in the central hole in the sanding disk 12 and be centered with respect to the central bore 101 in the sanding disk receptacle 100.

The positioning element 17 is axially movable in the direction of the central axis 18. The positioning element 17 is configured as a mandrel which is partially accommodated with its lower end 29 in a bore 21 in the base element 20. Arranged in the bore 21 is a spacer element 22, which is illustrated as a spring.

As soon as the sanding disk receptacle 100 passes into engagement with the positioning element 17 and is guided further downward, the translational part of the wobbling movement is passed into the mounting. The vibratory element 19 absorbs this wobbling movement and can accordingly balance it. Therefore, the sanding disk receptacle can execute only a rotational movement about the central axis 18 of the positioning element 17 as soon as the free end 28 of the positioning element 17 is engaged with the bore 101 in the sanding disk receptacle 100. Therefore, the sanding disk receptacle 100 has the central bore 101, the diameter of which corresponds to a diameter of the conical portion of the free end 28 of the positioning element 17 or is slightly greater than the diameter of the positioning element 17.

The rotational movement of the sanding disk receptacle 100 can be initiated or reinforced by a drive element 30, which is illustrated in FIG. 1. The drive element 30 comprises a nozzle, wherein a jet of pressurized fluid can be directed onto the sanding disk receptacle 100 by the nozzle. By use of the jet of pressurized fluid, the sanding disk receptacle 100 is set into rotational movement.

As soon as the sanding disk receptacle 100 executes a rotational movement, the work step of adjusting can be carried out. To this end, the sanding disk receptacle 100 is moved further downward along the central axis 18 in the direction of the new sanding disk 12. During this movement, the positioning element 17 is moved into the bore 21 counter to the spring force of the spacer element 22.

When the sanding disk receptacle 100 reaches the upper free end of the guide element(s) 16, the guide element 16 is or all the guide elements 16 are moved in the direction of the base element 20. The lower end of the guide element 16 is moved into a guide bore 24. Arranged between the end of the guide element 16 on the base-element side and the bottom of the guide bore 24 is a spring element 23. The upper end of the guide element 16 is in contact with the rotating sanding disk receptacle 100. As soon as the upper end of the guide element 16 meets the bore 101 in the sanding disk receptacle, the guide element 16 is pushed a little out of the guide bore 24. The upper end of the guide element 16 passes into engagement with the bore 101 in the sanding disk receptacle 100 and blocks the latter, such that a further rotational movement is prevented. In this position, the openings 32 in the sanding disk 12 are aligned exactly with the recesses 33 in the sanding disk receptacle 100. In this way, the sanding disk receptacle 100 is correctly positioned in order to receive a sanding disk 12. To this end, the sanding disk receptacle 100 is lowered further in the direction of the new sanding disk 12.

In each case one of the sanding disks 12 is removable from the opening 15. The diameter of the opening 15 is greater than the diameter of the sanding disk 12. Therefore, one of the three retaining elements 25 is shown, which projects into the opening 15 in order to hold the sanding disks 12 in the stacking device 10.

The stack of sanding disks 12 is carried by a support element 26, for example a disk or plate, which is movable along the axes of the guide element 16 and the central axis 18 of the positioning element 17 by a tensioning element 27 in the form of a spring. The tensioning element 27 is supported on the surface of the base element 20.

The sanding disk receptacle 100 is lowered until it comes into contact with the sanding disk 12. The sanding disk 12 sticks to the surface of the sanding disk receptacle 100, either by application of negative pressure, in order to draw in the sanding disk 12, or by a hook-and-loop fastener or a combination of different holding mechanisms. The sanding disk receptacle 100 with the sanding disk 12 is subsequently moved away from the stacking device and is ready to be used again.

If the sanding disk 12 is flexible, it is pulled past the retaining elements 25. If the sanding disk 12 is configured as a dimensionally stable sanding disk, the retaining elements 25 can be settable. For example they can be able to be flapped open or moved outward such that the sanding disk 12 can pass through the opening in an unimpeded manner.

Figure 3:
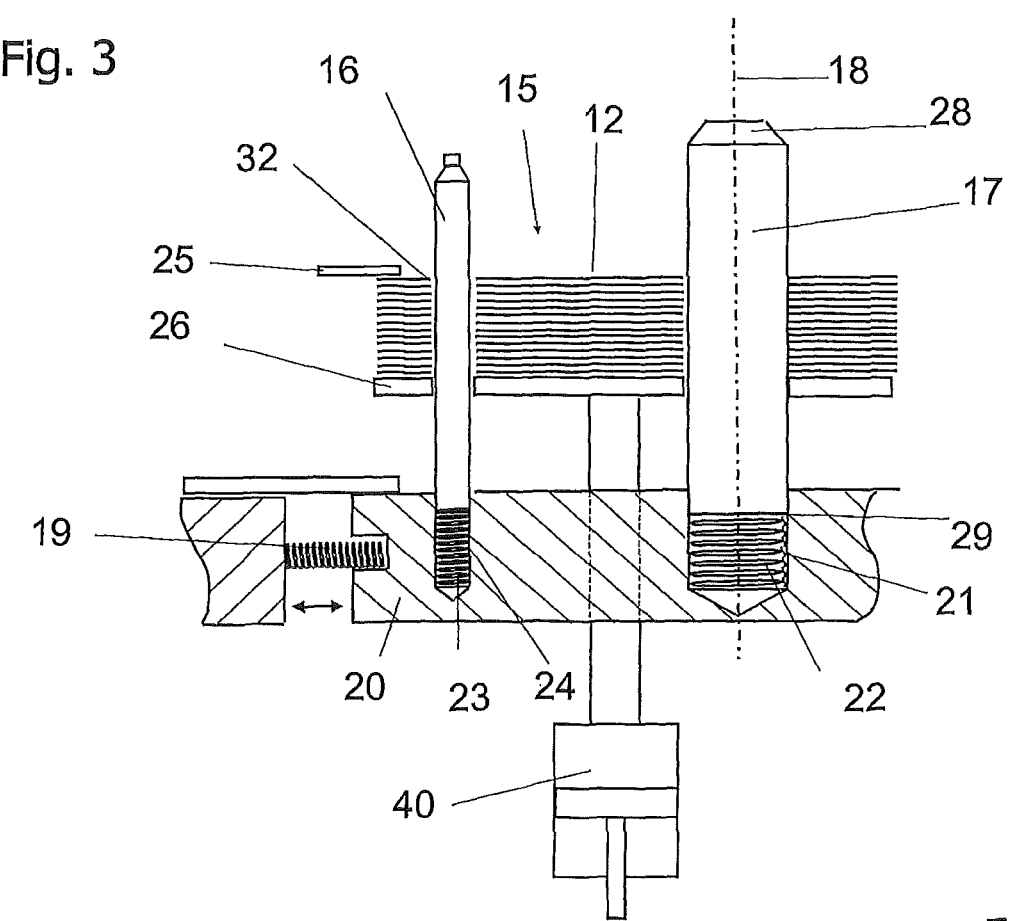
FIG. 3 shows a vertical section through a variant of the stacking device for sanding disks according to FIG. 1.

FIG. 3 shows a variant of FIG. 2, in which a lifting element 40 for feeding the sanding disks 12 of the sanding disk stack is provided.

Figure 4:
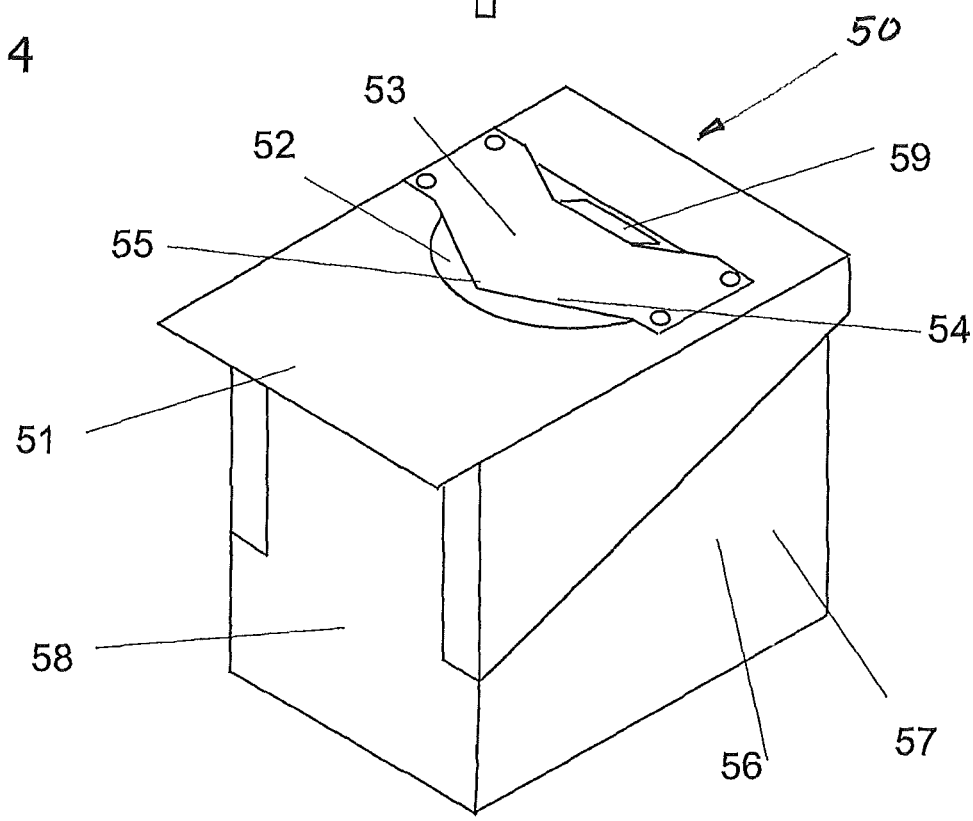
FIG. 4 shows a perspective view of a detaching device for used sanding disks.

FIG. 4 shows a view of a detaching device 50. The detaching device 50 serves to remove a sanding disk 12 from a sanding disk receptacle 100 before the disk change. A device 1 for automatically changing sanding disks 12 can comprise such a detaching device 50. Before a new sanding disk 12 can be positioned on the sanding disk receptacle 100, the worn or used sanding disk 12 has to be separated from the sanding disk receptacle 100.

The detaching device 50 comprises a support surface 51. The support surface 51 has an opening 52, the diameter of which is greater than the diameter of the sanding disk 12. A separating element 53 is arranged above the opening 52. The separating element 53 extends partially over the opening 52, such that the sanding disk receptacle 100 cannot pass into the opening 52.

The separating element 53 has at least one separating edge 54. The separating edge 54 comprises a point 55 which points radially in the direction of the rim of the opening 52. The point 55 can be configured in a V-shaped or W-shaped manner or with asymmetrically extending edges. The point 55 can have a jagged profile.

The separating element 53 can also be configured as a disk which has, at least along the separating edge 54, a wall thickness which is less than the distance of the sanding disk 12 from the sanding disk receptacle. For example, the separating element 53 can be configured as a thin-walled metal sheet.

The separating element 53 is fastened to the support surface 51 in a releasable manner by connecting means. Between the separating element 53 and the support surface 51, a spacer element can be fitted in order to set the distance of the separating element 53 from the support surface 51. The use of a spacer element makes it possible to use the device for types of sanding disks 12 with different thicknesses.

The separating element 54 can contain a deflection element which can support the detachment of the sanding disk 12.

A method for detaching a sanding disk 12 from a sanding disk receptacle comprises the following steps: the sanding disk receptacle 100 is guided over the shown support surface 51 of the detaching device 50, wherein the sanding disk receptacle 100 is in contact with the support surface 51. In the process, the sanding disk 12 is contacted by the separating element 53, the separating edge of which is pushed in between the sanding disk 12 and the support surface 51, with the result that the sanding disk 12 is detached from the sanding disk receptacle 100. The sanding disk 12 then drops through an opening 52 located beneath the separating edge 54 and into a collecting container 56.

The used sanding disks 12 are collected in the collecting container 56 arranged beneath the opening 52 and can be disposed of properly. Of the container 56, only a first side wall 57 and a second side wall 58 are visible in FIG. 4.

Figure 5A:
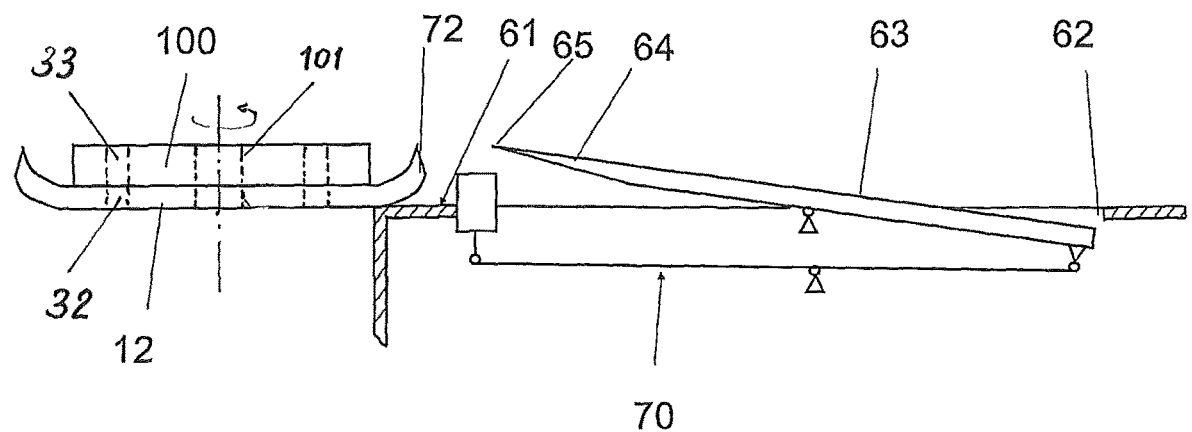
FIG. 5A shows a vertical section through a further exemplary embodiment of a detaching device.
Figure 5B:
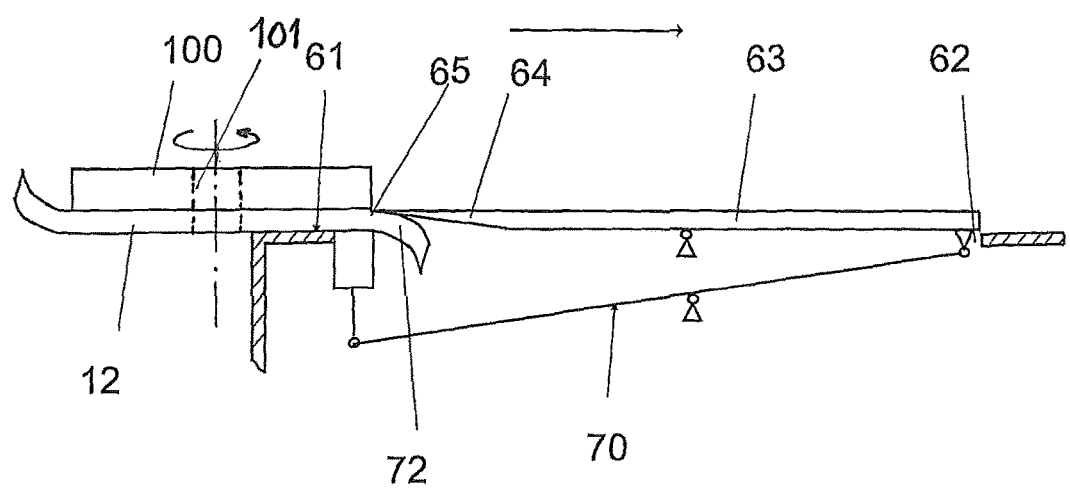
FIG. 5B shows a vertical section through the detaching device according to FIG. 5A at the start of the detaching operation.

FIG. 5A and FIG. 5B show a further exemplary embodiment of a detaching device 60. This detaching device 60 can be used when a sanding disk 12 is arranged on the sanding disk receptacle 100 such that the sanding disk 12 peripherally overlaps the sanding disk receptacle 100. The rim 72 of such a sanding disk 12 can be bent up such that it would come to lie above the separating edge 54 if the separating element 53 were used, as is shown in FIG. 4.

In this case, a tiltable separating element 63 can be used. This is arranged such that, in the tilted state, the separating edge 64, or at least the point 65 thereof, is located somewhat higher than the opposite end of the tiltable separating element 63. When the rim of the sanding disk receptacle 100 reaches the separating edge 64, a tilting mechanism 70 is actuated at this point by the sanding disk receptacle 100, said tilting mechanism 70 tilting the separating edge 64 in the direction of the support surface 61, such that the setting angle of the separating element 63 is reduced.

As a result of the change in angle, the separating edge 64 comes into contact with the rim 72 of the sanding disk 12 and pushes it in the direction of the support surface 61. The movement of the sanding disk receptacle 100 in the direction of the arrow 71 can then be continued, as is illustrated in FIG. 5B. The separating element 63 detaches the sanding disk 12 gradually from the sanding disk receptacle 100.

A system comprises a device 1 for automatically changing sanding disks 12, containing a stacking device 10, according to one of the preceding exemplary embodiments, and a detaching device 50, according to one of the preceding exemplary embodiments.

The invention claimed is:

1. A device for automatically changing sanding disks (12), comprising:
    a stacking device (10) for a plurality of sanding disks (12),
    a guide element (16) for vertical mutual orientation of openings (32) in the sanding disks (12) parallel to a common central axis (18), the guide element (16) is arranged eccentrically with respect to the central axis (18),
    a tool head having a rotatably mounted sanding disk receptacle (100) for a sanding disk (12), said tool head being arranged on a manipulation device for executing a sanding movement,
    a positioning element (17) located on the central axis (18) of the stacking device (10) for positioning the tool head with the sanding disk receptacle (100) formed thereon, the positioning element (17) and the guide element (16) are mounted for movement in a radial direction relative to the central axis in a floating manner on the stacking device (10), and
    a central opening (101) for receiving the positioning element (17) is formed in the tool head.

2. The device as claimed in claim 1, further comprising a base element (20) that receives the positioning element (17) and the guide element (16), the base element (20) contains a vibratory element (19) in the stacking device (10), said vibratory element (19) allowing the base element (20) to move in a radial direction with respect to the central axis (18).

3. The device as claimed claim 2, wherein the positioning element (17) is axially movable in a direction of the central axis (18) and is accommodated in an axially spring-elastic manner in a bore (21) in the base element (20), and a spring (2') is arranged as spacer element (22) in the bore (21).

4. The device as claimed in claim 3, wherein the positioning element (17) is configured as a mandrel and has an upper end (28) which is adapted to project out of an uppermost sanding disk (12) of a stack and has a lower end (29) which is accommodated in the bore (21).

5. The device as claimed in claim 4, wherein the upper end (28) comprises a conical portion.

6. The device as claimed in claim 1, wherein the positioning element (17) has a greater length than the guide element (16) and projects beyond the guide element (16).

7. The device as claimed in claim 1, further comprising a drive element (30) that is configured to initiate a rotary movement of the sanding disk receptacle (100).

8. The device as claimed in claim 6, wherein the drive element (30) comprises a jet of pressurized fluid directed out of a nozzle onto the sanding disk receptacle (100).

9. The device as claimed in claim 1, wherein the guide element (16) is mounted so as to be movable axially in a guide bore (24) by a spring (23).

10. A system comprising a device (1) for automatically changing sanding disks (12) as claimed in claim 1, and
    a detaching device (50) comprising:
    a support surface (51) that has an opening (52), a diameter of which is greater than a diameter of the sanding disks (12), and
    a separating element (53) is arranged above the opening.

* * * * *